United States Patent
Haas et al.

(10) Patent No.: US 6,904,987 B2
(45) Date of Patent: Jun. 14, 2005

(54) ELECTRICAL DRIVE FOR A VEHICLE

(75) Inventors: Hardy Haas, Ditzingen-Schoeckingen (DE); Ian Faye, Stuttgart (DE); Herbert Vollert, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 10/149,591

(22) PCT Filed: Dec. 14, 2000

(86) PCT No.: PCT/DE00/04460

§ 371 (c)(1),
(2), (4) Date: Aug. 28, 2002

(87) PCT Pub. No.: WO01/44007

PCT Pub. Date: Jun. 21, 2001

(65) Prior Publication Data

US 2003/0019675 A1 Jan. 30, 2003

(30) Foreign Application Priority Data

Dec. 15, 1999 (DE) .......................... 199 60 327

(51) Int. Cl.⁷ .............................. B60K 1/00
(52) U.S. Cl. ............... 180/65.6; 180/65.1; 192/221.1; 188/158
(58) Field of Search ............. 180/65.1, 65.5, 180/65.6, 60, 58, 370, 162, 72.1, 72.8; 188/162, 72.8, 72.1, 158–163, 72.4, 72.6; 192/221.1, 13 R, 12 D

(56) References Cited

U.S. PATENT DOCUMENTS

| 3,161,249 A | * | 12/1964 | Zuppiger et al. ............. 180/10 |
| 4,146,104 A | * | 3/1979 | Leembruggen ............ 180/65.6 |
| 4,799,564 A | | 1/1989 | Itami et al. |
| 5,139,121 A | | 8/1992 | Kumura et al. |
| 5,382,854 A | * | 1/1995 | Kawamoto et al. ....... 310/67 R |
| 5,813,488 A | | 9/1998 | Weiss |
| 5,833,035 A | * | 11/1998 | Severinsson ............... 188/72.7 |
| 6,000,507 A | * | 12/1999 | Bohm et al. ................. 188/158 |
| 6,254,198 B1 | * | 7/2001 | Zittlau ..................... 303/113.4 |
| 6,283,240 B1 | * | 9/2001 | Beever ....................... 180/178 |
| 6,286,637 B1 | * | 9/2001 | Park et al. .................. 188/158 |
| 6,412,885 B1 | * | 7/2002 | Shirai et al. ........... 303/122.09 |
| 6,415,212 B2 | * | 7/2002 | Nishizaki et al. ............. 701/41 |
| 6,450,587 B1 | * | 9/2002 | MacGregor et al. .......... 303/89 |
| 6,540,632 B1 | * | 4/2003 | Wendl et al. .................. 475/5 |
| 2002/0023791 A1 | * | 2/2002 | Kima et al. ................ 180/65.5 |

FOREIGN PATENT DOCUMENTS

| CH | 161 213 A | 4/1933 |
| DE | 195 19 198 A | 11/1996 |
| FR | 2 663 591 A | 12/1991 |

* cited by examiner

*Primary Examiner*—Brian L. Johnson
*Assistant Examiner*—J. Allen Shriver
(74) *Attorney, Agent, or Firm*—Ronald E. Greigg

(57) ABSTRACT

An electric drive for an electric or hybrid vehicle has an electric motor, with which a vehicle wheel is drivable, for instance via an articulated shaft. The the electric drive is embodied additionally with a mechanically actuatable wheel brake, which is actuatable by the electric motor selectively for driving the vehicle wheel via a shiftable distributor gear. The invention has the advantage that the electric motor provided for driving the vehicle wheel is simultaneously used for actuating the wheel brake (24) as well.

9 Claims, 3 Drawing Sheets

ELECTRICAL DRIVE FOR A VEHICLE

CROSS-REFERENCE TO RELATED APPLICATIONS

This application is a 35 U.S.C. 371 application of PCT/DE00/04460, filed on Dec. 14, 2000.

BACKGROUND OF THE INVENTION

1. Field of the Invention

The invention relates to an electric drive for a vehicle having a torque-transmitting device for transmitting torque from an electric motor to a vehicle wheel.

2. Description of the Prior Art

Electric drives are known, per se, for use especially in electric or hybrid vehicles and are supplied with electrical energy by a battery (actually an accumulator) or a fuel cell. In city driving, a hybrid vehicle uses the electric drive, for instance, producing no exhaust gas, while on the highway it uses an internal combustion engine that simultaneously recharges the battery.

The known electric drives, for instance in accordance with French Patent Disclosure FR 2 663 591 A, have an electric motor and a torque-transmitting device, for instance a gear, with which a torque of the electric motor can be transmitted to one or more vehicle wheels. An electric motor can be provided for driving all the vehicle wheels, the wheels of one axle, or one vehicle wheel.

It is also known to use the electric drive for braking the vehicle, by operating the electric motor as a generator and feeding electric current into the battery. However, this type of braking has the disadvantage that the braking torque is rpm-dependent, and thus the braking action is only slight at low speeds. Furthermore, the vehicle cannot be braked to a stop, since when it is stopped there is no braking action. Additional brakes, such as conventional disk or drum brakes, are therefore always necessary.

ADVANTAGES OF THE INVENTION

SUMMARY OF THE INVENTION

The electric drive of the invention having the characteristics of claim 1 has a wheel brake which is actuatable via the moment-transmitting device by the electric motor of the electric drive. To actuate the wheel brake, the moment-transmitting device of the invention has a branching point, which enables a selective drive of the electric motor or an actuation of the wheel brake. So-called electromechanical wheel brakes that are actuatable by means of an electric motor are known per se; see for instance International Patent Disclosure WO 96/03301. The known wheel brakes have an electric motor with which a friction brake lining can be pressed against a brake body, such as a brake disk or brake drum, and lifted up from it again via a gear that converts rotation into translation, typically a worm gear. In the electric drive of the invention, the actuation of the wheel brake is effected by the electric motor of the electric drive via the moment-transmitting device. The branching point of the moment-transmitting device enables selectively driving one vehicle wheel or actuating the wheel brake.

The electric drive of the invention has a wheel brake which is actuatable via the moment-transmitting device by the electric motor of the electric drive. To actuate the wheel brake, the torque-transmitting device of the invention has a branching point, which enables a selective drive of the vehicle by means of the electric motor or an actuation of the wheel brake. So-called electromechanical wheel brakes that are actuatable by means of an electric motor are known per se; see for instance International Patent Disclosure WO 96/03301. The known wheel brakes have an electric motor with which a friction brake lining can be pressed against a brake body, such as a brake disk or brake drum, and lifted up from it again via a gear that converts rotation into translation, typically a worm gear. In the electric drive of the invention, the actuation of the wheel brake is effected by the electric motor of the electric drive via the moment-transmitting device. The branching point of the torque-transmitting device enables selectively driving one vehicle wheel or actuating the wheel brake.

The invention has the advantage that the electric motor of the electric drive is also used to actuate the wheel brake. The wheel brake requires no electric motor of its own. This saves both weight and space in the vehicle. Another advantage of the invention is that a braking torque of the wheel brake of the electric drive is independent of the rotary speed of the wheel and thus of the speed of the vehicle. Moreover, braking down to a stop is possible, as is a parking brake function. Independently of this, it is also possible with the electric drive of the invention to operate the electric motor as a generator for braking the vehicle, in order to charge a battery, at least if the wheel brake is not actuated. Another advantage of the invention is that the electric motor rotates while the vehicle is in motion, and to actuate the wheel brake there is accordingly no need to accelerate from a stop first; hence the actuation of the wheel brake can be accomplished very quickly, with virtually no time lag.

In one feature of the invention, the torque-transmitting device has a distributor gear with a gear input, which is drivable by the electric motor, and with at least two gear outputs. The vehicle wheel is connected to and drivable by one of the gear outputs, and with a further gear output the wheel brake is actuatable; that is, its rotation/translation conversion gear, for instance, can be driven to rotate in order to press a friction brake lining against and lift the lining away from a brake body. The two gear outputs are drivable selectively with the gear input, or in other words are shiftable.

For disconnecting the gear outputs in accordance with a feature of the invention, a disconnector, such as a shiftable coupling is provided. This may be either a frictional- or positive-engagement coupling.

In another feature of the invention, the torque-transmitting device has a differential gear, such as a planetary gear with which a distribution of the torque of the electric motor to the vehicle wheel and the wheel brake is possible with an intrinsically arbitrary ratio; it is also possible for solely the vehicle wheel to be driven or solely for the wheel brake to be actuated. This feature of the invention has the advantage that it is not only either the vehicle wheel that is driven or the wheel brake that is actuated, but rather that both are simultaneously possible. As a result, in the generator mode, the electric motor can be used for braking the vehicle wheel, and at the same time the wheel brake can be actuated. Another advantage of this feature of the invention is that in the event of a current failure, the wheel brake can be actuated by the rotating vehicle wheel via the differential gear.

In a further feature of the invention, a shiftable rotational direction reversal on the order of a reverse gear is provided. This has the advantage that to move the vehicle in reverse and/or to release the wheel brake, the direction of rotation of the electric motor need not be reversed.

Another feature of the invention provides a hydraulic pump which is drivable by the electric motor and with which a hydraulic motor can be driven for driving the vehicle wheel. This feature of the invention also has a hydraulically actuatable wheel brake, that is, for instance a conventional, hydraulically actuatable disk brake caliper, which for the actuation is supplied hydraulically with energy from the hydraulic pump. The actuation of the wheel brake can for instance be done with magnet valves, in the manner known from so-called electrohydraulic brakes. This feature of the invention has the advantage of being very flexible in distributing hydraulic energy from the hydraulic pump to the driven vehicle wheel or wheels and the hydraulically actuatable wheel brake or brakes, and in the case of an adjustable hydraulic pump and/or an adjustable hydraulic motor, it is quite flexible in boosting the torque from the electric motor to the hydraulic motor that drives the vehicle wheel and for a possible reversal of the direction of rotation.

BRIEF DESCRIPTION OF THE DRAWINGS

The invention will be described in further detail below with reference to the drawings, in which.

DESCRIPTION OF THE PREFERRED EMBODIMENTS

Figure 1:
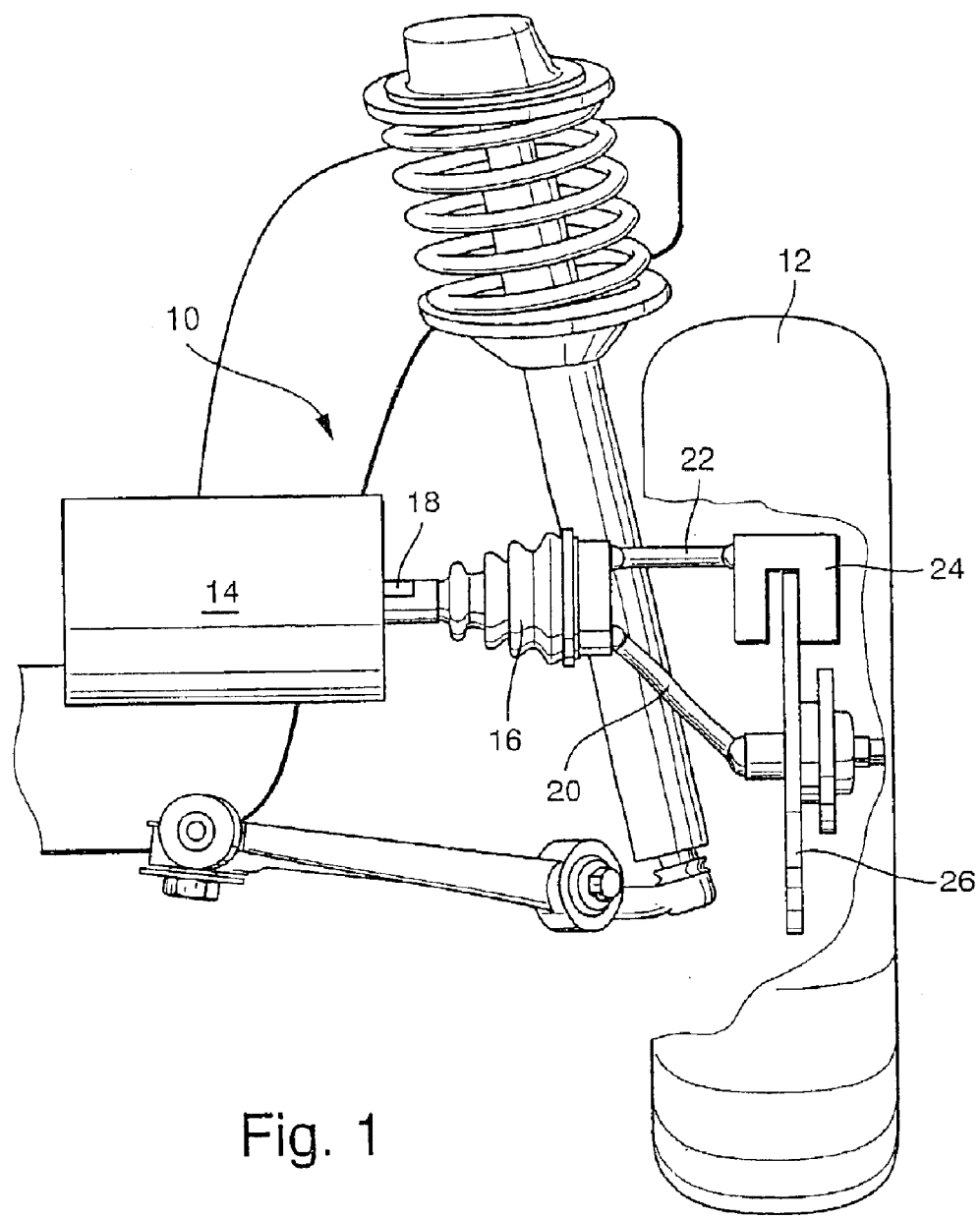
FIG. 1, an electric drive of the invention for a vehicle, in an elevation view.

The electric drive 10 according to the invention, shown in FIG. 1, for a vehicle wheel 12 has an electric motor 14, which is mounted securely to the body of the vehicle. Mounted on the motor 14 is a gear 16, as a torque-transmitting device 16, with a gear input 18 and two gear outputs 20, 22. The gear input 18 is drivable by the electric motor 14. With one gear output 20, via an articulated shaft also identified by reference numeral 20, the vehicle wheel 12 can be driven. Instead of just the vehicle wheel 12, in some embodiments of the invention a wheel brake 24 is selectively actuatable as well, simultaneously with the drive of the vehicle wheel 12. The wheel brake 24 is embodied as a mechanically actuatable disk brake. Wheel brakes 24 of this kind are known per se to one skilled in the art, and since the wheel brake 24 itself is not the subject of the invention, its structure need not be described in further detail here. As one example of a possible design for wheel brake 24, see WO 96/03301, which discloses an electromechanically actuatable disk brake. The wheel brake 24 has a spindle gear, not shown, as its rotation/translation conversion gear, which converts a rotary driving motion of the electric motor 14, which is transmitted via the gear 16 and the other gear output 22 to the wheel brake 24, into a displacement motion for pressing friction brake linings against a brake disk 26 and lifting them again. Instead of the vehicle wheel 12, in some embodiments of the invention a wheel brake 24 is selectively actuatable as well, simultaneously with the drive of the vehicle wheel 12. The wheel brake 24 is embodied as a mechanically actuatable disk brake. Wheel brakes 24 of this kind are known per se to one skilled in the art, and since the wheel brake 24 itself is not the subject of the invention, its structure need not be described in further detail here. As one example of a possible design for wheel brake 24, see WO 96/03301, which discloses an electromechanically actuatable disk brake. The wheel brake 24 has a spindle gear, not shown, as its rotation/translation conversion gear, which converts a rotary driving motion of the electric motor 14, which is transmitted via the gear 16 and the other gear output 22 to the wheel brake 24, into a displacement motion for pressing friction brake linings against a brake disk 26 and lifting them again.

Figure 2:
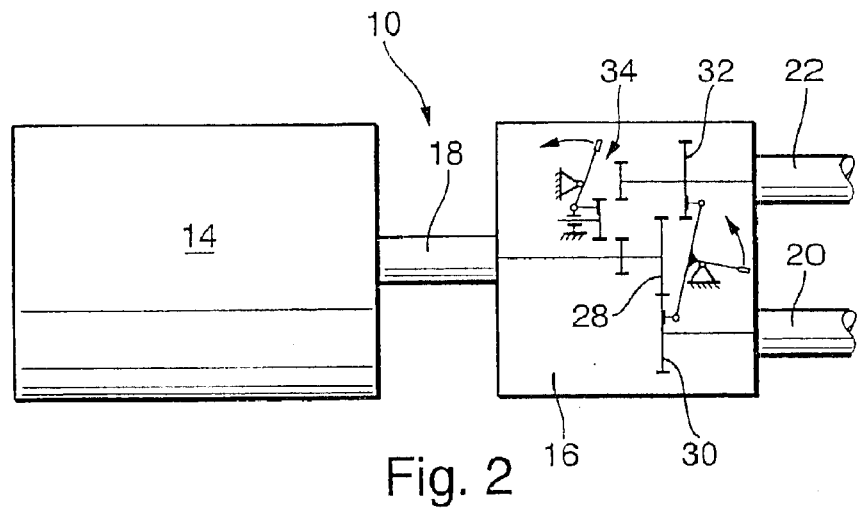
FIGS. 2–6, mechanical circuit diagrams of embodiments of the drive of FIG. 1.

FIG. 2 shows one possible embodiment of the electric drive 10 for a vehicle that is shown in FIG. 1. Here the torque-transmitting device 16 is embodied as a gear-wheel distributor gear 16, with the gear input 18 and the two gear outputs 20, 22. A gear wheel 28 connected to the gear input 18 in a manner fixed against relative rotation can be made to mesh selectively with one of two gear wheels 30, 32, of which one gear wheel 30 is connected in a manner fixed against relative rotation to the one gear output 20 for driving the vehicle wheel 12, and the other gear wheel 32 is connected, also in a manner fixed against relative rotation, to the other gear output 22 for actuating the wheel brake 24. Thus the distributor gear 28, 30, 32 is shiftable, to enable selectively driving one of the two gear outputs 20, 22 by the electric motor 14. In addition, the distributor gear 16 has a shiftable rotational direction reversal 34, that is, a kind of reverse gear for the other gear output 22 for actuating the wheel brake 24. The reversal 34 of the direction of rotation makes it possible, with the electric motor 14 rotating forward, to release the wheel brake 24; to do so does not require reversing the direction of rotation of the electric motor 14, or in other words the electric motor 14 need not be braked to a stop and then accelerated again in the opposite direction. With the reversal 34 of the direction of rotation, it is also possible, with the electric motor 14 rotating in reverse (reverse motion), to tighten the wheel brake 24 without having to reverse the direction of rotation of the electric motor 14. A reversal of the direction of rotation can in principle also be provided (not shown) for the gear output 20 for driving the vehicle wheel 12. Upon engagement of the reversal 34 of the direction of rotation, it is understood that the paired gear wheels 28, 32 for the other gear output 22 must be disengaged. Preferably the paired gear wheels 28, 30 for the gear output 20 are also disengaged.

Figure 3:
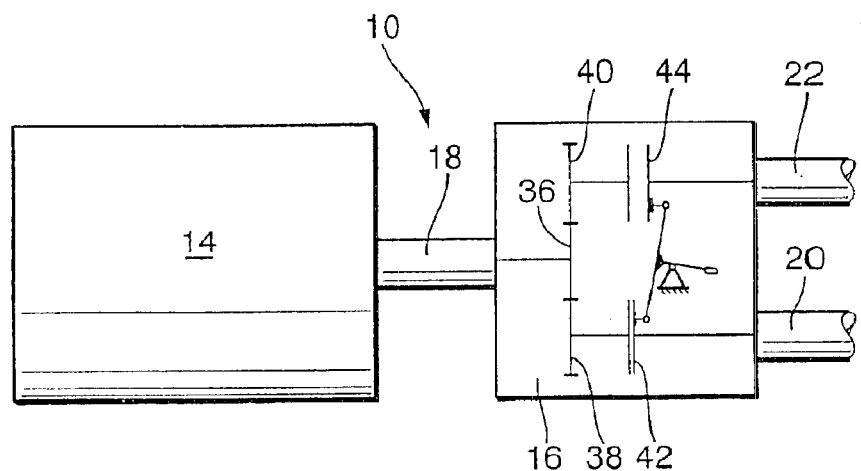

FIG. 3 shows another possible embodiment of the torque-transmitting device 16 of the electric drive 10 of the invention for a vehicle. In FIG. 3 as well, the torque-transmitting device 16 is embodied as a gear wheel vehicle wheel. The gear wheel vehicle wheel 16 has one gear wheel 36 connected to the gear input 18 in a manner fixed against relative rotation and hence drivable with the electric motor 14; this gear wheel meshes with two gear wheels 38, 40, which are connected to the two gear outputs 20, 22 in a manner fixed against relative rotation. The distributor gear 16 has one shiftable coupling 42, 44 for each gear output 20, 22, so that one or the other gear output 20, 22 is drivable selectively by the electric motor 14 via the distributor gear 16.

Figure 4:
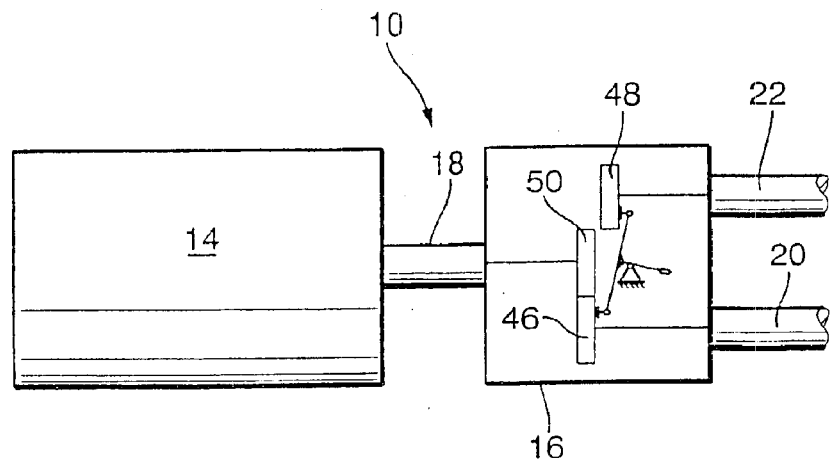

In the embodiment of the invention shown in FIG. 4, the torque-transmitting device 16 is embodied as a friction wheel distributor gear. The friction wheel distributor gear 16 has one friction wheel 46, 48 for each of the two gear outputs 20, 22, and these friction wheels can be brought selectively into driving connection with a drive wheel 50, which is drivable by the electric motor 14 via the gear input 18.

Figure 5:
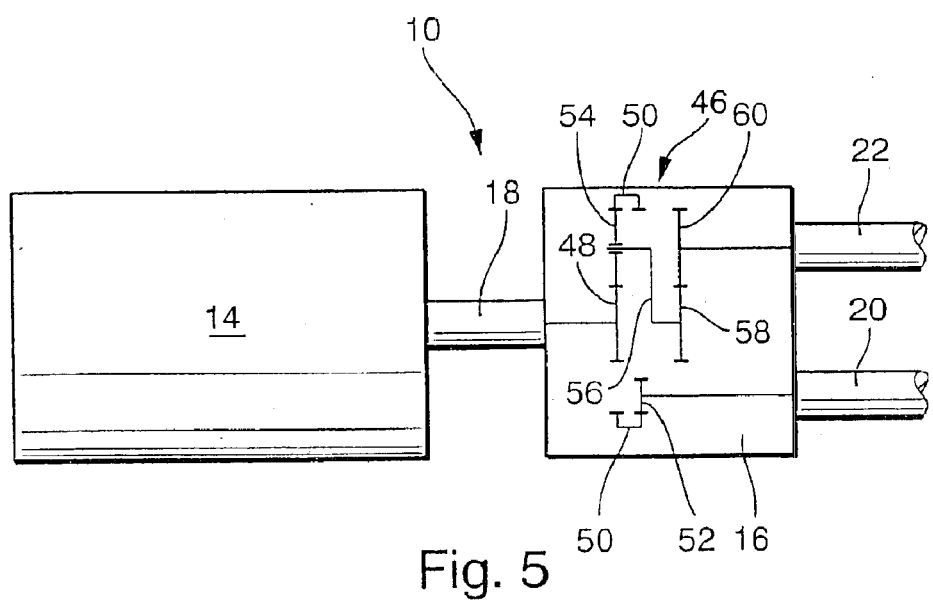

In the embodiment of the invention shown in FIG. 5, the torque-transmitting device 16 has a differential gear, which in the exemplary embodiment shown is embodied as a planetary gear 46. In the exemplary embodiment shown, a sun wheel 48 of the planetary gear 46 is connected to the gear input 18 in a manner fixed against relative rotation. The drive of the one gear output 20 for driving the vehicle wheel 12 is effected via a ring gear (internal gear wheel) 50 of the planetary gear 46, which has a second set of teeth with which a gear wheel 52, which is connected to the gear output 20 in a manner fixed against relative rotation, meshes. The drive of the other gear output 22 for the actuation of the wheel brake 24 is effected via a sun wheel 56, which carries planet wheels 54 of the planetary gear 46 and with which a gear wheel 58, disposed coaxially to the sun wheel 48, is connected in a manner fixed against relative rotation. This gear wheel 58 meshes with a gear wheel 60, which is connected to the other gear output 22 in a manner fixed against relative rotation. By stopping the sun wheel 56, the drive of the one gear output 20 for driving the vehicle wheel 12 by the electric motor 14 is effected via the gear input 18, the sun wheel 48, the planet wheels 54, which rotate about their own axis but because of the stopped sun wheel 56 do not revolve, and the ring gear 50 and the gear wheel 52. For actuating the wheel brake 24, the ring gear 50 is stopped instead of the sun wheel 56, and the drive is effected by the electric motor 14 via the gear input 18, the sun wheel 48, the revolving planet wheels 54, the sun wheel 56, and the two gear wheels 58, 60. If the sun wheel 56 or the ring gear 50 is braked but not stopped, then both gear outputs 20, 22 can be driven simultaneously; the torque distribution between the two gear outputs 20, 22 is adjustable by varying the braking moment exerted on the sun wheel 56 or the ring gear 50.

It is understood that a planetary gear also allows shifting possibilities different from those shown and described. Hence the sun wheel 48 need not be driven by the electric motor 14; instead, in a manner known per se, the sun wheel 56 or the ring gear 50 can also be driven, and the power takeoff can be effected with the other two elements, that is, the sun wheel 48 and the ring gear 50 or the sun wheel 56. A reversal of the direction of rotation is also possible with a planetary gear, in a manner known per se. Connecting multiple planetary sets in line with one another can increase the number of possible variations, and in particular different gear ratios can thus be achieved.

Figure 6:
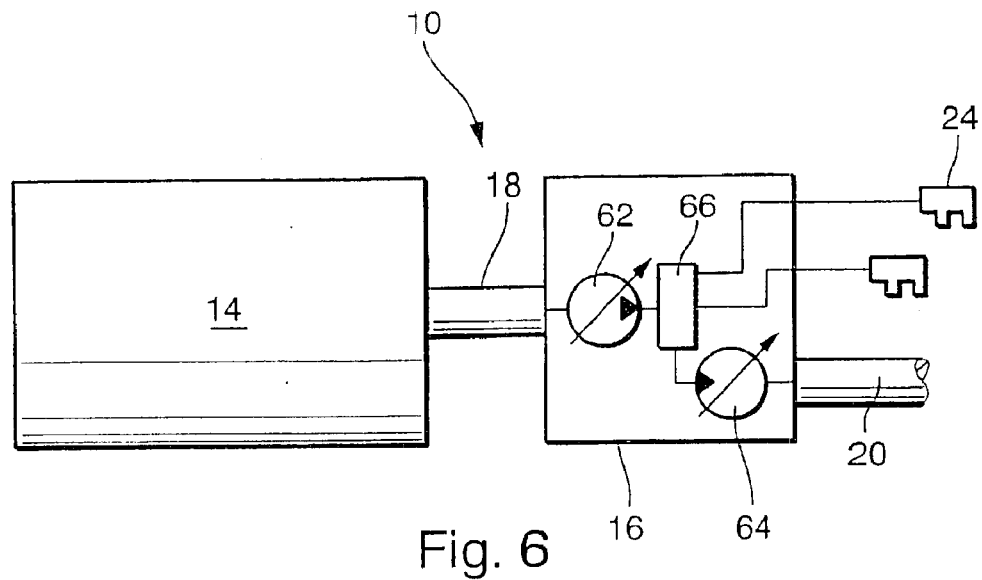

FIG. 6 shows a hydraulic coupling of the drive of the vehicle wheel 12 and the wheel brake 24 by means of the torque-transmitting device 16 to the electric motor 14. The torque-transmitting device 16 of the electric drive 10 for a vehicle shown in FIG. 6 has a hydraulic gear with a hydraulic pump 62, a hydraulic motor 64, and a hydraulic control unit 66 that has magnet valves. The hydraulic pump 62 and the hydraulic motor 64 are preferably embodied adjustably. The hydraulic pump 62 is drivable by the electric motor 14. It furnishes hydraulic energy for driving one or more vehicle wheels 12 and for actuating the wheel brakes 24. Via the hydraulic control circuit 66, the hydraulic motor 64 can be made to communicate hydraulically with the hydraulic pump 62; the hydraulic motor 64 drives one or more vehicle wheels 12. It is also possible for a plurality of hydraulic motors 64 to be provided, for instance one hydraulic motor 64 for each driven vehicle wheel 12. In the exemplary embodiment of the invention shown in FIG. 6, the wheel brakes 24 are embodied as hydraulic brake calipers 24, which can be subjected to the hydraulic energy of the hydraulic pump 62 via the hydraulic control circuit 66 and are accordingly hydraulically actuatable. Intrinsically this means an electrohydraulic brake, in which by means of the hydraulic control circuit 66, in a manner known per se, anti-locking and traction control can also be effected.

The foregoing relates to preferred exemplary embodiments of the invention, it being understood that other variants and embodiments thereof are possible within the spirit and scope of the invention, the latter being defined by the appended claims.

We claim:

1. An electric drive for a vehicle, comprising
   an electric motor,
   a torque-transmitting device with which a torque of the electric motor can be transmitted to a vehicle wheel,
   the electric drive (10) having a wheel brake (24), and
   the torque-transmitting device (16) having a branching point with which the wheel brake (24) can be selectively actuated.

2. The electric drive of claim 1 wherein the torque-transmitting device (16) has a distributor gear (28, 30, 32; 36, 38, 40; 46, 48, 50) with one gear input (18) drivable by the electric motor (14) and with at least two gear outputs (20, 22), the two gear outputs (20, 22) being selectively drivable by the gear input (18), and the vehicle wheel (12) is drivable by the one gear output (20) and the wheel brake (24) is actuatable by the other gear output (22).

3. The electric drive of claim 2 wherein the two gear outputs (20, 22) have a disconnector (42, 44), with which they are disconnectable from the gear input (18).

4. The electric drive of claim 3 wherein the disconnectors (42, 44) have shiftable couplings.

5. The electric drive of claim 2 wherein the distributor gear has a friction wheel gear (46, 48, 50).

6. The electric drive of claim 1 wherein the torque-transmitting device (16) has a differential gear (46).

7. The electric drive of claim 6 wherein the differential gear is a planetary gear (46).

8. The electric drive of claim 1 wherein the torque-transmitting device (16) has a shiftable rotational direction reversal (34).

9. The electric drive of claim 1 wherein the torque-transmitting device (16) comprises a hydraulic pump (62), which is drivable by the electric motor (14); a hydraulic motor (64), drivable by the hydraulic pump (62), for driving the vehicle wheel (12); and a hydraulically actuated wheel brake (24).

* * * * *